W. W. BUCHER.
ELECTRICAL GENERATING SYSTEM.
APPLICATION FILED JUNE 2, 1916.
1,332,707.
Patented Mar. 2, 1920.
Fig. 1.
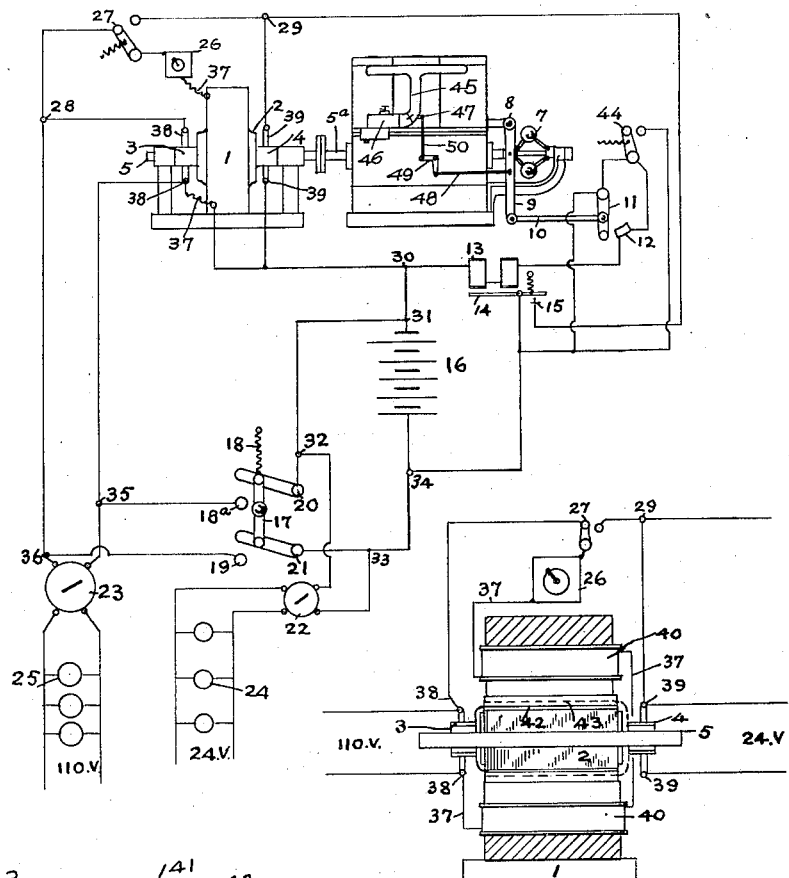
Fig. 2.
Fig. 3.
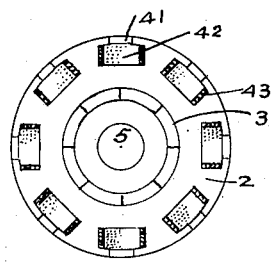
William W. Bucher Inventor
N. S. Amstutz
By
Attorney

UNITED STATES PATENT OFFICE.

WILLIAM W. BUCHER, OF CHICAGO, ILLINOIS, ASSIGNOR TO ELECTROMATIC SYSTEM COMPANY, OF PORTLAND, MAINE, A CORPORATION OF MAINE.

ELECTRICAL GENERATING SYSTEM.

1,332,707.  Specification of Letters Patent.  Patented Mar. 2, 1920.

Application filed June 2, 1916. Serial No. 101,264.

*To all whom it may concern:*

Be it known that I, WILLIAM W. BUCHER, citizen of the United States, residing at Chicago, in the county of Cook and State of Illinois, have invented certain new and useful Improvements in Electrical Generating Systems, of which the following is a specification.

My invention relates to improvements in electrical generating systems and it consists more especially of the features pointed out in the annexed claims.

The purpose of my invention is to provide a single dynamo electric machine connected to an internal combustion engine that will simultaneously supply both low and high voltage continuous currents through the use of a single armature and brushes operating on separate commutators; that automatically charges a storage battery; that controls the battery connections by means of a centrifugal governor and suitable self restoring switches; that may use the battery currents to start the engine through the dynamo serving as a motor from either end of the armature utilizing either the high or low voltage windings; that can simultaneously supply high and low voltage service mains and a storage battery independently of each other.

With these and other ends in view I illustrate in the accompanying drawing such instances of adaptation as will disclose the broad underlying features without limiting myself to the specific details shown.

Figure 1 is a diagrammatic view of a duplex dynamotor serving various demands for current.

Fig. 2 is a diagrammatic elevation in partial section showing the field magnets, the armature, etc.

Fig. 3 is an end elevation of an armature in section.

In the use of isolated electric lighting plants for country houses, etc., it has been found that standard voltage lamps, etc., require a full voltage of at least fifty-five storage cells which require no small attention and demand a considerable investment. As there are many cells the deterioration factor becomes a large item. On the other hand it is desirable to use standard lamps, fittings, etc., for the major lighting purposes on account of greater simplicity of installation and maintenance if such advantages can be secured without the disadvantages referred to.

The adaptation instanced in the accompanying drawing serves a real need. Whenever it is desired to have an all day current, in smaller installations, for hallways, closets, etc., special leads are run to such locations and current at about 24 volts supplied from a storage battery. This service is entirely independent of the regular 110 volt mains and fixtures. Whenever the standard voltage service is to be used current is supplied from the dynamotor direct at 110 volts from the opposite end of the armature supplying 24 volts.

A twenty-four volt battery requires but 12 cells, taking but a small amount of room and serving in addition to the low voltage special leads to start the engine by supplying current to the 24 volt end of the armature as long as a spring returning hand switch keeps the circuit closed or furnishing current to the 110 volt end of the armature so as to start the engine. In either case the field rheostat may be connected to the armature end which is to be used.

By placing separate and independent windings in some or all of the regular armature slots a most compact and self-contained electric unit is produced without recourse to complex mechanism, circuits, etc.

One form of dynamotor, 1 which lends itself to an attainment of the objects of this system comprises the usual field magnets 40 which are connected by leads 37 respectively to rheostat 26 and brushes 38 which engage commutator 3 of the 110 volt end of armature 2. The armature 2 may be made in any well known way, mounted on shaft 5, having laminated disks threaded onto the shaft and retaining heads inside of commutators 3 and 4. The fine wire coils 42 may be placed in the middle of each slot 41 or alternate slots or any practical combination of occupied or unoccupied slots may be used. In the instance shown the low voltage coils 43 are inserted on each side of the fine wire coils so as to leave the 110 volt coils more easily accessible because higher voltage conditions tend to more rapid deterioration than low voltage ones.

The armature shaft 5 is connected to engine shaft 5ª. This shaft is a part of engine 6. In plants of this semi-automatic type a mechanical governor 7 is used to hold the engine speed constant under varying loads by the direct control of the fuel charges from carbureter 46 supplied to the engine manifold 45 in any well known manner, such for instance as a link 48 connected to the throttle 47 and the governor arm 9 by bell crank 49 and another link 50. The governor arm is fulcrumed at 8 and it serves also to disconnect the storage battery 16 from armature 4 when the engine stops because of the open relation of switch 44. This is accomplished by means of link 10 that is attached to switch 11. The switch closes the circuit over contact 12.

In case the battery is to be used to start the engine through the 24 volt windings the hand switch 44 is moved into an "on" position against the tension of a spring which on release immediately opens the circuit as soon as the engine becomes self-actuating. As long as the hand switch 44 is held in its "on" position the current from the battery 16 which is to direct the real starting current controlled by magnet 13 will flow from the battery, past junction 34 to hand switch 44, to contact 12, to magnet 13, past junctions 30 and 31 back to the battery. This current energizes magnet 13 to attract its armature 14 so as to close the starting circuit at 15, when current will flow over the latter from the battery, past junction 34, over closed contact 15, past junction 29, to commutator 4, over brushes 39, past junctions 30 and 31 to the battery. This current will continue to flow so long as the spring retracted hand switch 44 is held in an "on" position to retain magnet 13 in an energized condition.

It of course would be impracticable to compel the operator to hold the switch 44 all the time the plant is to be in operation. To avoid this the engine governor 7, through fulcrumed lever 9 and link 10 attached to switch 11, closes a shunt circuit to switch 44 at 12, thus retaining the activity of magnet 13 by current from the battery 16 flowing past junction 34 to switch 11, contact 12, magnet 13 and past junctions 30 and 31 back to the battery. This connection will be continued so long as the engine is under operation, causing the battery to float on the line and receive its charging current from the commutator 4 over brushes 39, past junctions 29, 34, 31, and 30. When the battery becomes charged its voltage rises to that of the 24 volt armature so that the flow of current from the generator will practically cease, but the magnet 13 being still supplied by the battery will keep the charging circuit unbroken and allow the battery to "float" on the line until the magnet circuit is broken at 11 and 12, through a stoppage of the engine. This circuit is not again restored until the switch 44 is closed by hand to at another time restart the engine, which on again coming to speed causes the engine governor to close switch 11 at 12 and thus repeat the cycle.

When the battery 16 is used to supply current to the 24 volt windings for starting purposes the hand switch 44 is closed as mentioned and in addition switch 27 places the shunt windings 40 into connection with brushes 39 so as to excite the field. Switches 44 and 27 may be interconnected mechanically if desired and a separate rheostat 26 included in the circuit.

It has been found that a 24 volt current from battery 16 will supply sufficient amperes to the 110 volt armature windings to turn the engine shaft 5ᵃ the required amount to start it. This result is reached by using switch 17 to connect the battery to the line at junctions 35, 36 and 28 when current will be supplied to brushes 38 and shunt field winding 37. The switch 27 may have a tension spring attached thereto so as to normally keep the field circuit closed for the 110 volt armature windings. Switch 17 is automatically set to an "off" position by spring 18 as soon as it is no longer held when starting the engine. The circuit includes fingers which connect 18ᵃ to 20 and 19 to 21.

The low voltage lamps 24 are controlled by a main switch 22 and the standard voltage lamps 25 by a similar switch 23. The battery wires join the switch wires at 32 and 33.

The governor switch 11 is automatically opened at a certain lowering engine speed, to disconnect the battery circuit from the generator, at 12, so that the battery will not be discharged into the armature windings when the engine comes to rest. This switch 11 cannot again become active until hand switch 44 is closed at the time another start is to be made.

It will be apparent that the dynamotor in connection with the battery and circuits instanced forms a very flexible electric unit adaptable to all isolated demands for current without an expensive installation.

What I claim is—

1. In automatic electric generating systems, an internal combustion engine, an electric generator connected thereto, a low and a separate high voltage source of current comprised in said generator, a low voltage storage battery, manual means for connecting the same to the low or high voltage part of the generator to start the engine, separate means dependent on the operation of the engine for keeping the battery connected to the low voltage source of the generator so long as the engine remains in operation and thereafter automatically disconnecting the battery when the engine is stopped.

2. In automatic electric generating systems, an internal combustion engine, a generator comprising a single source of magnetization, a dual voltage armature driven by the engine within such field adapted to supply currents at low and high voltages independently of each other, a low voltage storage battery, manual means for connecting the battery to the low voltage armature through a control magnet to start the engine, means for independently retaining a battery connection to the armature so as to receive a low voltage current control operated by the engine in coöperation with the magnet control, and alternative manual means for connecting the low voltage battery to the high voltage portion of the armature independently of the other specified connections to thereby also cause the generator to act as a motor and thus start the engine.

3. In automatic electric generating systems, an internal combustion engine, a source of high and low voltage current in a dynamo driven by the engine, said dynamo having separate voltage armature windings, a source of low voltage current comprised in a storage battery, service mains connected to the high voltage portion of the dynamo, separate service mains connected to the low voltage battery, separate manual means for connecting the battery to either the low or high voltage parts of the generator to start the engine, and a shunt connection controlled by the speed of the engine adapted to be placed in parallel with the means for connecting the battery to the low voltage end of the dynamo in order to retain the battery floating on the line until disconnected therefrom through the stoppage of the engine.

4. In automatic electric generating systems, a double ended armature, commutators for each end, a shaft therefor, low voltage and high voltage windings on the armature, connections therefrom to the respective commutators, an internal combustion engine connected to the shaft, a low voltage storage battery, manual means for connecting the battery to the low end of the armature to receive current therefrom, automatic means controlled by the engine adapted to independently maintain a connection to deliver current to the battery for recharging purposes, means for simultaneously supplying current from the high voltage end of the armature to the service mains direct, separate means for delivering current at a different time from the battery to the high voltage windings, to rotate the armature and start the engine, and means adapted to automatically break the low voltage circuit from the dynamo to the battery when the engine is stopped.

5. In electric generating systems, an internal combustion engine, a dynamo driven thereby and adapted to generate separate and independent currents of low and high voltage characteristics, high voltage service mains, low voltage service mains, a low voltage storage battery, a governor actuated by the engine, self retracting hand switches adapted to separately control the flow of current at different times from the battery to the low voltage portion of the dynamo or the high voltage part over the high voltage mains, or to the low voltage service mains, and means for causing said governor to throttle the engine to control its speed and simultaneously keep the battery circuit closed to the low voltage side of the dynamo as long as the engine is under normal operation and open the same when the engine slows up preparatory to stopping.

In testimony whereof I affix my signature in presence of two witnesses.

WILLIAM W. BUCHER.

Witnesses:
   N. S. AMSTIETZ,
   A. M. SCHERTZER.